(12) United States Patent
Koh et al.

(10) Patent No.: US 8,236,191 B2
(45) Date of Patent: Aug. 7, 2012

(54) ELECTRICAL DOUBLE LAYER CAPACITOR

(75) Inventors: Meiten Koh, Settsu (JP); Akiyoshi Yamauchi, Settsu (JP); Rumi Takeuchi, Settsu (JP); Michiru Tanaka, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 410 days.

(21) Appl. No.: 12/522,635

(22) PCT Filed: Jan. 11, 2008

(86) PCT No.: PCT/JP2008/050252
§ 371 (c)(1),
(2), (4) Date: Jul. 9, 2009

(87) PCT Pub. No.: WO2008/084846
PCT Pub. Date: Jul. 17, 2008

(65) Prior Publication Data
US 2010/0033899 A1    Feb. 11, 2010

(30) Foreign Application Priority Data
Jan. 12, 2007   (JP) .................. 2007-004542

(51) Int. Cl.
H01G 9/038   (2006.01)
H01G 9/058   (2006.01)
B82B 1/00    (2006.01)

(52) U.S. Cl. ....... 252/62.2; 361/502; 361/503; 29/25.06
(58) Field of Classification Search ................. 252/62.2; 361/502, 503; 29/25.06
See application file for complete search history.

(56) References Cited

U.S. PATENT DOCUMENTS

| | | | | |
|---|---|---|---|---|
| 5,750,730 A | * | 5/1998 | Nakano et al. | 549/229 |
| 6,210,835 B1 | * | 4/2001 | Arai | 429/231.95 |
| 7,854,855 B2 | * | 12/2010 | Koh et al. | 252/62.2 |
| 2003/0129490 A1 | | 7/2003 | Mitani et al. | |
| 2005/0117275 A1 | * | 6/2005 | Fujino et al. | 361/502 |
| 2009/0086408 A1 | | 4/2009 | Koh et al. | |

FOREIGN PATENT DOCUMENTS

| | | | |
|---|---|---|---|
| JP | 64-14882 A | | 1/1989 |
| JP | 5-325985 A | | 12/1993 |
| JP | 8-37025 A | | 2/1996 |
| JP | 8-107048 A | | 4/1996 |
| JP | 8-222485 A | | 8/1996 |
| JP | 08-298134 A | | 11/1996 |
| JP | 9-7896 A | | 1/1997 |
| JP | 9-55342 A | | 2/1997 |
| JP | 9-63644 A | | 3/1997 |
| JP | 09-148197 | * | 6/1997 |
| JP | 9-148197 A | | 6/1997 |
| JP | 9-251861 A | | 9/1997 |
| JP | 10-189043 A | | 7/1998 |
| JP | 10-233345 A | | 9/1998 |
| JP | 2001-256983 A | | 9/2001 |
| JP | 2002-222739 A | | 8/2002 |
| JP | 2002-260966 A | | 9/2002 |
| JP | 2003-142099 A | | 5/2003 |
| JP | 2005-265896 A | | 9/2005 |
| JP | 2006-4978 A | | 1/2006 |
| JP | 2006-024747 A | | 1/2006 |
| WO | WO 2005/027158 | * | 3/2005 |
| WO | 2006/106655 A1 | | 10/2006 |
| WO | WO 2006/106655 | * | 10/2006 |

* cited by examiner

*Primary Examiner* — Carol M Koslow
(74) *Attorney, Agent, or Firm* — Sughrue Mion, PLLC

(57) ABSTRACT

The present invention provides an electrical double layer capacity comprising a non-aqueous electrolytic solution comprising (A) a solvent comprising a specific fluorine-containing cyclic carbonate and (B) an electrolyte salt comprising a cyclic quaternary onium salt comprising cyclic quaternary onium cation and $PF_6^-$, $(CF_3SO_2)_2N^-$ or $(C_2F_5SO_2)_2N^-$, and (C) a polarizable electrode, and having high withstanding voltage and assuring excellent solubility in a wide range of solvents for dissolving an electrolyte salt.

12 Claims, No Drawings

ELECTRICAL DOUBLE LAYER CAPACITOR

TECHNICAL FIELD

The present invention relates to an electrical double layer capacitor comprising a non-aqueous electrolytic solution comprising a solvent comprising a specific fluorine-containing cyclic carbonate and a specific electrolyte salt, and a polarizable electrode.

BACKGROUND ART

In an electrical double layer capacitor having an electrolytic solution between a pair of electrodes, charging and discharging are physically conducted by adsorption and desorption of ions, which differs from a secondary battery in which charging and discharging are conducted by chemical reaction. Therefore, in discharging, electric current can be quickly taken out, and charging can be completed rapidly.

An electrolytic solution to be used for an electrical double layer capacitor are required to have various characteristics, and one of them is high withstanding voltage, namely, an electrolytic solution is required to have resistance to degradation (reduction decomposition) when exposed to high voltage for a long period of time.

For improving withstanding voltage of an electrical double layer capacitor, JP64-14882A proposes secondary power source which has an upper limit voltage of 3V and is equipped with a positive electrode comprising activated carbon as main component and a negative electrode made of carbon material having 0.338 to −0.356 nm of a face-to-face distance of [002] faces by X-ray diffraction and previously occulted with lithium ion. In addition, JP8-107048A and JP9-55342A propose secondary power source using, on a negative electrode, carbon material being capable of undergoing adsorption and desorption of lithium ion and previously subjected to occlusion with lithium ion by a chemical method or an electrochemical method. However, in the case of using carbon material undergoing occlusion of lithium ion on a negative electrode, it is necessary to previously conduct doping of lithium ion, which leads to high cost, and in addition, large swelling and shrinkage of the carbon material occur and cycle characteristics are not good.

Example of another method of improving withstanding voltage of an electrical double layer capacitor is the use of quaternary onium salt having polyfluoroalkyl group as an electrolyte as disclosed in JP2002-222739A. However, in the case where a fluorine content of this quaternary onium salt is small, an effect of improving withstanding voltage is low, and, for example, in the case of use for an electrical double layer capacitor, it only has oxidation resistance up to 2.8V, and thus, it cannot be said that withstanding voltage is improved. Further, solubility is low and ionic conductivity is also low.

Further, JP2002-260966A discloses an electrical double layer capacitor using, as an electrolyte, a salt prepared by introducing fluorine atom to an imidazolium salt. However, even in this electrical double layer capacitor, a significant effect of improving withstanding voltage cannot be seen by the introduction of fluorine atom, and the electrical double layer capacitor has only withstanding voltage up to 3.3V.

As mentioned above, there are trials of improving withstanding voltage of an electrical double layer capacitor such as the use of carbon material undergoing occlusion of lithium ion as a negative electrode and modification of an electrolyte salt, but these trials are not always sufficient.

On the other hand, in the case of an electrical double layer capacitor using polarizable electrodes on both of a positive electrode and a negative electrode, there are trials of improving withstanding voltage of an electrical double layer capacitor by improving withstanding voltage of a solvent by using a fluorine-containing carbonate (for example, refer to JP8-222485A, JP9-148197A, JP9-7896A, JP9-251861A and JP10-233345A). However, in these techniques, while there is improvement in withstanding voltage of an electrical double layer capacitor by the use of a fluorine-containing carbonate, even in the case of using polarizable electrodes on both electrodes, withstanding voltage is up to 3.3V at most, and further improvement in withstanding voltage up to 3.5V and 4.0V cannot be desired.

DISCLOSURE OF INVENTION

As a result of intensive study, the inventors of the present invention have found that in the case of using a solvent comprising a specific fluorine-containing cyclic carbonate, a cyclic quaternary onium salt comprising a cyclic quaternary onium cation and a specific anion, and polarizable electrodes, a stable behavior can be obtained even at 3.5V and 4.0V, and have completed the present invention.

Namely, it is an object of the present invention to provide an electrical double layer capacitor having high withstanding voltage and assuring excellent solubility in a wide variety of solvents for dissolving an electrolyte salt.

The present invention relates to an electrical double layer capacitor comprising:

a non-aqueous electrolytic solution comprising (A) a solvent comprising a fluorine-containing cyclic carbonate represented by the formula (1):

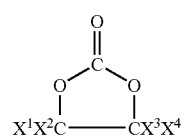

wherein $X^1$ to $X^4$ are the same or different and each is —H, —F, —CF$_3$, —CHF$_2$, —CH$_2$F, —C$_2$F$_5$ or —CH$_2$CF$_3$; at least one of $X^1$ to $X^4$ is —F, —CF$_3$, —C$_2$F$_5$ or —CH$_2$CF$_3$, and (B) an electrolyte salt comprising a cyclic quaternary onium salt comprising a cyclic quaternary onium cation and a counter anion, and (C) a polarizable electrode comprising activated carbon.

It is preferable that the fluorine-containing cyclic carbonate contained in the solvent (A) is at least one selected from the group consisting of:

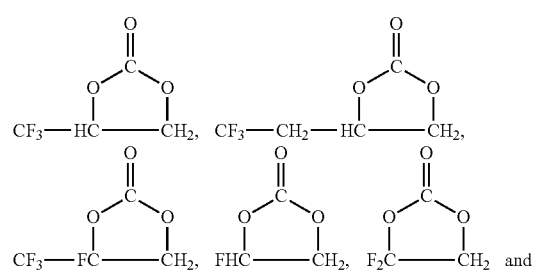

-continued

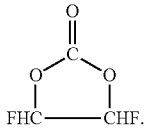

It is preferable that the solvent (A) consists of the fluorine-containing cyclic carbonate represented by the formula (1).

It is preferable that the solvent (A) is a mixture of the fluorine-containing cyclic carbonate represented by the formula (1) and at least one kind selected from the group consisting of a fluorine-containing chain carbonate, a fluorine-containing chain ester and a fluorine-containing chain ether.

It is preferable that the fluorine-containing chain carbonate is one represented by the formula (2):

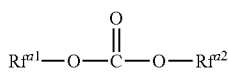 (2)

wherein $Rf^{a1}$ and $Rf^{a2}$ are the same or different and each is an alkyl group having 1 to 4 carbon atoms or a fluorine-containing alkyl group having 1 to 4 carbon atoms, and at least either of them is a fluorine-containing alkyl group having 1 to 4 carbon atoms.

It is preferable that the fluorine-containing chain ester is one represented by the formula (3):

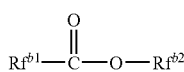 (3)

wherein $Rf^{b1}$ and $Rf^{b2}$ are the same or different and each is a fluorine-containing alkyl group having 1 to 4 carbon atoms.

It is preferable that the fluorine-containing chain ether is one represented by the formula (4):

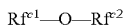 (4)

wherein $Rf^{c1}$ and $Rf^{c2}$ are the same or different and each is a fluorine-containing alkyl group having 2 to 4 carbon atoms.

It is preferable that the solvent (A) is a mixture of a fluorine-containing cyclic carbonate of

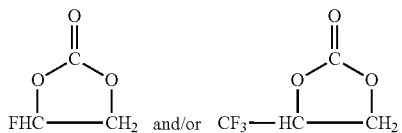

and at least one kind of a fluorine-containing chain ether selected from the group consisting of $CF_3CF_2CH_2$—O—$CF_2CFHCF_3$, $HCF_2CF_2CH_2$—O—$CF_2CFHCF_3$, $CF_3CF_2CH_2$—O—$CF_2CF_2H$, and $HCF_2CF_2CH_2$—O—$CF_2CF_2H$.

It is preferable that the cyclic quaternary onium salt is a spiro-ring bipyridinium salt or an imidazolium salt.

It is preferable that the counter anion of the cyclic quaternary onium salt is $PF_6^-$, $BF_4^-$, $(CF_3SO_2)_2N^-$ or $(C_2F_5SO_2)_2N^-$.

It is preferable that the above-mentioned anion is $PF_6^-$.

It is preferable that the activated carbon constituting the polarizable electrode is one having a potassium content of 0 to 400 ppm, further preferably not more than 200 ppm measured by an extraction method.

It is preferable that the activated carbon is one prepared by alkali activation treatment using pitch as a starting material.

It is preferable that the above-mentioned non-aqueous electrolytic solution contains 0.05 to 5% by mass of a surfactant based on the weight of the solvent (A).

It is preferable that the surfactant is one represented by the formula (18):

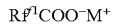

wherein $Rf^1$ is a perfluoroalkyl group having 2 to 10 carbon atoms in which a part thereof may be replaced by hydrogen atoms, $M^+$ is $NH_4^+$, $Li^+$, $Na^+$ or $K^+$, or the formula (19):

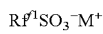

wherein $Rf^1$ is a perfluoroalkyl group having 2 to 10 carbon atoms in which a part thereof may be replaced by hydrogen atoms, $M^+$ is $NH_4^+$, $Li^+$, $Na^+$ or $K^+$.

BEST MODE FOR CARRYING OUT THE INVENTION

The electrical double layer capacitor of the present invention comprises the non-aqueous electrolytic solution comprising the specific solvent (A) and the specific electrolyte salt (B), and the polarizable electrode (C).

The solvent (A) comprises a fluorine-containing cyclic carbonate represented by the formula (1):

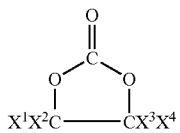 (1)

wherein $X^1$ to $X^4$ are the same or different and each is —H, —F, —$CF_3$, —$CHF_2$, —$CH_2F$, —$C_2F_5$ or —$CH_2CF_3$; at least one of $X^1$ to $X^4$ is —F, —$CF_3$, —$C_2F_5$ or —$CH_2CF_3$.

$X^1$ to $X^4$ are —H, —F, —$CF_3$, —$CHF_2$, —$CH_2F$, —$C_2F_5$ or —$CH_2CF_3$, and from the viewpoint of dielectric constant, viscosity and compatibility with other solvents, —F, —$CF_3$, and —$CH_2CF_3$ are preferred.

In the formula (1), —F, —$CF_3$, or —$C_2F_5$ may substitute all of $X^1$ to $X^4$ or may substitute only one of $X^1$ to $X^4$. From the viewpoint of dielectric constant and oxidation resistance, it is preferable that —F, —$CF_3$, or —$C_2F_5$ may substitute one or two of $X^1$ to $X^4$.

The fluorine content of the fluorine-containing cyclic carbonate is preferably 15 to 55% by mass, more preferably 17 to 44% by mass from the viewpoint of dielectric constant and oxidation resistance.

Among the fluorine-containing cyclic carbonates, those mentioned below are preferred from the viewpoint that especially excellent characteristics such as high dielectric constant and high withstanding voltage are exhibited and solubility of an electrolyte salt and decrease in internal resistance are satisfactory, thereby improving characteristics of the electrical double layer capacitor of the present invention.

Examples of fluorine-containing cyclic carbonates having high withstanding voltage and assuring good solubility of an electrolyte salt are, for instance,

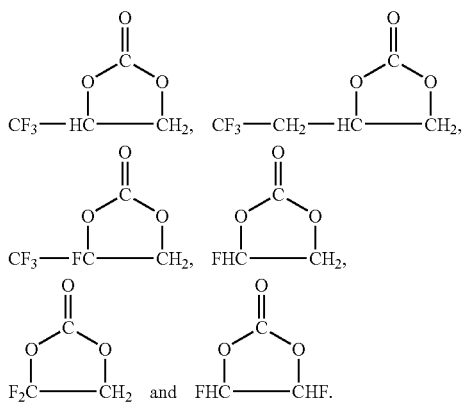

Examples of other fluorine-containing cyclic carbonates which can be used are:

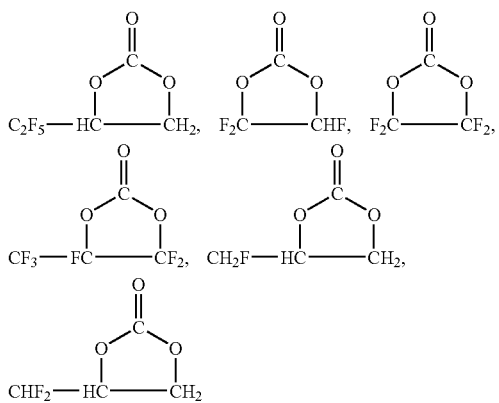

and the like.

The content of the fluorine-containing cyclic carbonate in the solvent (A) is preferably 100 to 20% by volume, more preferably 90 to 20% by volume from the viewpoint of satisfactory dielectric constant and viscosity.

The solvent (A) may comprise only the fluorine-containing cyclic carbonate represented by the formula (1) or may be a mixture of the fluorine-containing cyclic carbonate with other fluorine-containing solvent for dissolving an electrolyte salt and other non-fluorine-containing solvent for dissolving an electrolyte salt. Since a fluorine-containing cyclic carbonate is generally high in a melting point, there is a case where its behavior at low temperature is hindered in the case of single use thereof. In such a case, from the viewpoint of improvement in oxidation resistance, viscosity and low temperature characteristics, it is preferable to use a mixture of the fluorine-containing cyclic carbonate represented by the formula (1) and other fluorine-containing solvent for dissolving an electrolyte salt.

Examples of a fluorine-containing solvent for dissolving an electrolyte salt which is used as a co-solvent for the fluorine-containing cyclic carbonate represented by the formula (1) are fluorine-containing chain carbonates, fluorine-containing chain esters, fluorine-containing chain ethers, fluorine-containing lactones and fluorine-containing sulfolane derivatives.

Example of a preferred fluorine-containing chain carbonate is one represented by the formula (2):

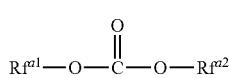

wherein $Rf^{a1}$ and $Rf^{a2}$ are the same or different and each is an alkyl group having 1 to 4 carbon atoms or a fluorine-containing alkyl group having 1 to 4 carbon atoms, and at least either of them is a fluorine-containing alkyl group having 1 to 4 carbon atoms, from the viewpoint of satisfactory viscosity and oxidation resistance.

Examples of $Rf^{a1}$ and $Rf^{a2}$ are, for instance, alkyl groups having 1 to 4 carbon atoms such as $-CH_3$, $-CH_2CH_3$ and $-CH(CH_3)_2$; and fluorine-containing alkyl groups having 1 to 4 carbon atoms such as $-CF_3$, $-CF_2CF_3$, $-CH(CF_3)_2$, $-CH_2CF_3$, $-CH_2C_2F_5$, $-CH_2CF_2CHF_2$, and $-CH_2CF_2CFHCF_3$, and from the viewpoint of satisfactory viscosity and oxidation resistance, $-CH_2CF_3$ and $-CH_2C_2F_5$ are preferred.

Among the fluorine-containing chain carbonates, from the viewpoint that especially excellent characteristics such as high dielectric constant and high withstanding voltage can be exhibited and solubility of an electrolyte salt, decrease in internal resistance and low temperature characteristics are satisfactory, thus improving characteristics of the electrical double layer capacitor of the present invention, preferred are:

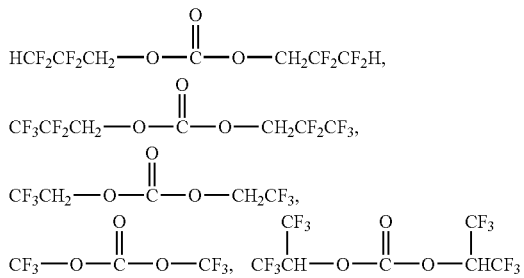

and the like.

Examples of other fluorine-containing chain carbonates which can be used are:

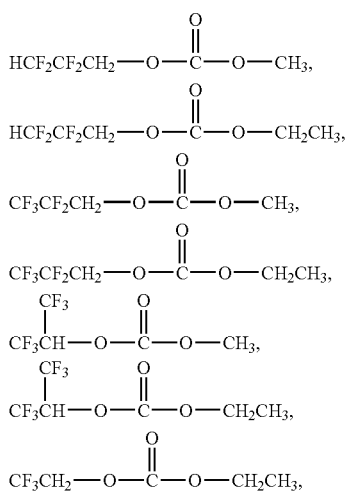

-continued

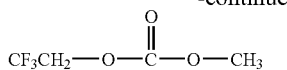

and the like. In addition, there are exemplified compounds described in JP6-21992A, JP2000-327634A and JP2001-256983.

Among them, from the viewpoint of satisfactory oxidation resistance and solubility of an electrolyte salt,

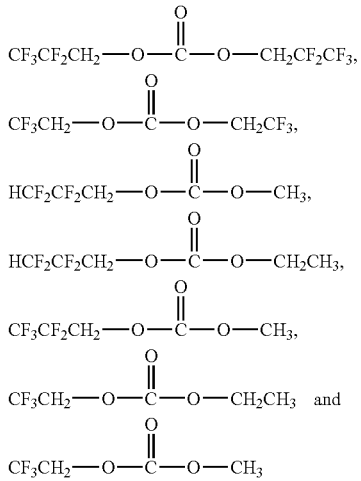

are preferred.

Example of a preferred fluorine-containing chain ester is one represented by the formula (3):

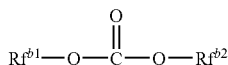

wherein $Rf^{b1}$ and $Rf^{b2}$ are the same or different and each is a fluorine-containing alkyl group having 1 to 4 carbon atoms, from the viewpoint of high flame retardance and satisfactory compatibility with other solvents and oxidation resistance.

Examples of $Rf^{b1}$ are, for instance, —$CF_3$, —$CF_2CF_3$, —$CF_2CHF_2$, —$CHF_2$, —$CF_2CH_3$, and —$CH_2CF_3$, and from the viewpoint of satisfactory viscosity and oxidation resistance, —$CF_3$ and —$CF_2CF_3$ are preferred.

Examples of $Rf^{b2}$ are, for instance, —$CF_3$, —$C_2F_5$, —$CH(CF_3)_2$, —$CH_2CF_3$, —$C_2H_4CF_3$, —$CH_2CF_2CHFCF_3$, —$CH_2C_2F_5$, —$CH_2CF_2CHF_2$, —$C_2H_4C_2F_5$, and —$CH_2C_3F_7$, and from the viewpoint of satisfactory compatibility with other solvent, —$CH_2CF_3$, —$CH(CF_3)_2$, —$CH_2C_2F_5$, and —$CH_2CF_2CHF_2$ are preferred.

Examples of fluorine-containing chain esters are, for instance, $CF_3C(=O)OC_2F_5$, $CF_3C(=O)OCH_2CF_3$, $CF_3C(=O)OCH_2CH_2CF_3$, $CF_3C(=O)OCH_2C_2F_5$, $CF_3C(=O)OCH_2CF_2CF_2H$, $CF_3C(=O)OCH(CF_3)_2$, $CF_3C(=O)OCH(CF_3)_2$, and the like. Among these, from the viewpoint of satisfactory compatibility with other solvent, viscosity and oxidation resistance, $CF_3C(=O)OC_2F_5$, $CF_3C(=O)OCH_2C_2F_5$, $CF_3C(=O)OCH_2CF_2CF_2H$, $CF_3C(=O)OCH_2CF_3$ and $CF_3C(=O)OCH(CF_3)_2$ are especially preferred.

Examples of fluorine-containing chain ethers are, for instance, compounds described in JP8-37024A, JP9-97627A, JP11-26015A, JP2000-294281A, JP2001-52737A and JP11-307123A.

Especially fluorine-containing ethers represented by the formula (4):

wherein $Rf^{c1}$ and $Rf^{c2}$ are the same or different and each is a fluorine-containing alkyl group having 2 to 4 carbon atoms, are preferred from the viewpoint of satisfactory compatibility with other solvents and proper boiling point.

Examples of $Rf^{c1}$ are, for instance, —$CH_2CF_2CHF_2$, —$CH_2C_2F_4CHF_2$, —$CH_2CF_3$, —$CH_2C_3F_6CHF_2$, —$CH_2C_2F_5$, —$CH_2CF_2CHFCF_3$, —$CH_2CF(CF_3)CF_2CHF_2$, —$C_2H_4C_2F_5$, and —$C_2H_4CF_3$, and preferred $Rf^{c2}$ are, for example, —$CF_2CHFCF_3$, —$C_2F_4CHF_2$, —$C_2H_4CF_3$, —$CH_2CHFCF_3$, and $C_2H_4C_2F_5$. Especially from the viewpoint of satisfactory viscosity and oxidation resistance and proper boiling point, $Rf^{c1}$ and $Rf^{c2}$ are preferably fluorine-containing alkyl groups having 2 to 4 carbon atoms.

Examples of fluorine-containing lactone are, for instance, those represented by the formula (7):

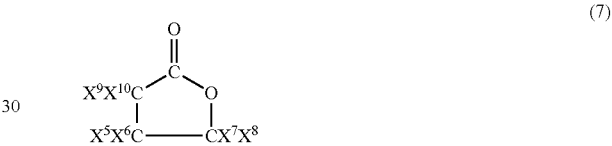

wherein $X^5$ to $X^{10}$ are the same or different and each is —H, —F, —Cl, —$CH_3$, or a fluorine-containing methyl group; at least one of $X^5$ to $X^{10}$ is a fluorine-containing methyl group.

The fluorine-containing methyl group in $X^5$ to $X^{10}$ is —$CH_2F$, —$CHF_2$ or —$CF_3$, and from the viewpoint of satisfactory withstanding voltage, —$CF_3$ is preferred.

The fluorine-containing methyl group may substitute all of $X^5$ to $X^{10}$, or may substitute one of $X^5$ to $X^{10}$. From the viewpoint of satisfactory solubility of an electrolyte salt, it is preferable that 1 to 3, especially 1 to 2 fluorine-containing methyl groups substitute in $X^5$ to $X^{10}$.

The substituted position of fluorine-containing methyl group is not limited particularly, and from the viewpoint of good synthesis yield, it is preferable that $X^7$ and/or $X^8$, especially $X^8$ is a fluorine-containing methyl group, especially —$CF_3$. In $X^5$ to $X^{10}$, a group other than fluorine-containing methyl group is —H, —F, —Cl or —$CH_3$, and from the viewpoint of satisfactory solubility of an electrolyte salt, —H is preferred.

Examples of fluorine-containing lactone other than those represented by the above-mentioned formula (7) are, for instance, fluorine-containing lactones represented by the formula (8):

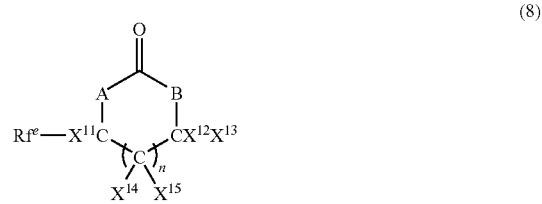

either A or B is $CX^{16}X^{17}$ ($X^{16}$ and $X^{17}$ are the same or different and each is —H, —F, —Cl, —$CF_3$, —$CH_3$, or an alkyl group in which hydrogen atom may be replaced by halogen atom and hetero atom may be contained in its chain), and another one is oxygen atom; $Rf^e$ is a fluorine-containing ether group, a fluorine-containing alkoxy group or a fluorine-containing alkyl group having two or more carbon atoms; $X^{11}$ and $X^{12}$ are the same or different and each is —H, —F, —Cl, —$CF_3$, or —$CH_3$; $X^{13}$ to $X^{15}$ are the same or different and each is —H, —F, —Cl or an alkyl group in which hydrogen atom may be replaced by halogen atom and hetero atom may be contained in its chain; n is 0 or 1.

Examples of preferred fluorine-containing lactones represented by the formula (8) are those having 5-membered ring structure represented by the formula (8-1):

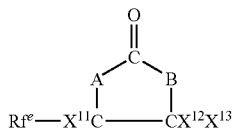
(8-1)

wherein A, B, $Rf^e$, $X^{11}$, $X^{12}$ and $X^{13}$ are as defined in the formula (8), from the viewpoint of easy synthesis and satisfactory chemical stability.

Depending on combination of A and B, there are two fluorine-containing lactones represented by the formula (8-1), namely, one is a fluorine-containing lactone represented by the formula (8-1-1):

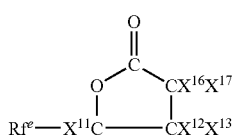
(8-1-1)

wherein $Rf^e$, $X^{11}$, $X^{12}$, $X^{13}$, $X^{16}$ and $X^{17}$ are as defined in the formula (8-1), and another one is a fluorine-containing lactone represented by the formula (8-1-2):

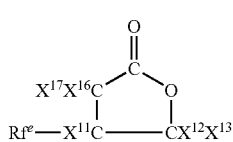
(8-1-2)

wherein $Rf^e$, $X^{11}$, $X^{12}$, $X^{13}$, $X^{16}$ and $X^{17}$ are as defined in the formula (8-1).

Among these, from the viewpoint that especially excellent characteristics such as high dielectric constant and high withstanding voltage can be exhibited and solubility of an electrolyte salt and decrease in internal resistance are satisfactory, thereby improving characteristics of the electrolytic solution in the present invention,

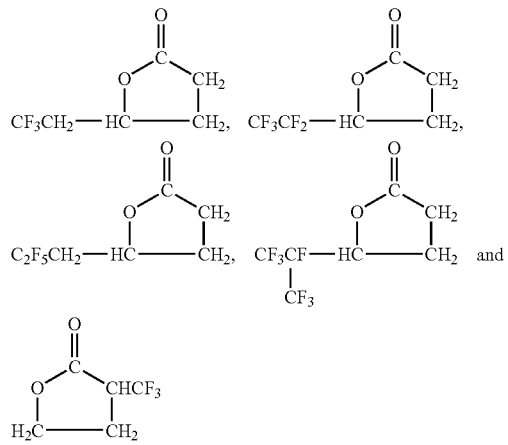

are preferred.

Examples of other fluorine-containing lactones which can be used are:

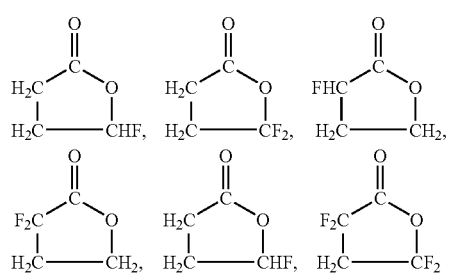

and the like.

Examples of fluorine-containing sulfolane derivatives are fluorine-containing sulfolane derivatives described in JP2003-132994A, and among these,

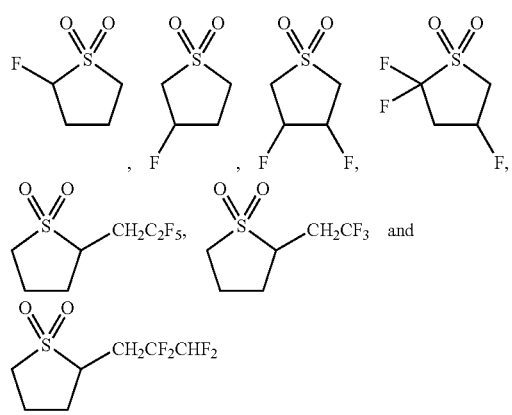

are preferred.

Examples of a non-fluorine-containing solvent for dissolving an electrolyte salt which is used as a co-solvent for the fluorine-containing cyclic carbonate represented by the formula (1) are non-fluorine-containing cyclic carbonates, non-fluorine-containing chain carbonates, non-fluorine-containing chain esters, non-fluorine-containing chain ethers, non-fluorine-containing lactones, non-fluorine-containing sulfolane derivatives and other non-fluorine-containing solvents for dissolving an electrolyte salt.

Examples of non-fluorine-containing cyclic carbonates are, for instance,

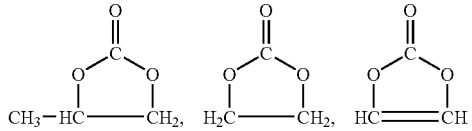

and the like.

Examples of preferred non-fluorine-containing chain carbonates are those represented by the formula (9):

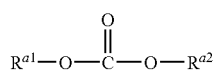

(9)

wherein $R^{a1}$ and $R^{a2}$ are the same or different and each is an alkyl group having 1 to 4 carbon atoms.

Among the non-fluorine-containing chain carbonates, from the viewpoint that especially excellent characteristics such as high dielectric constant and high withstanding voltage can be exhibited and solubility of an electrolyte salt and decrease in internal resistance are satisfactory, thereby improving characteristics of the electrical double layer capacitor of the present invention,

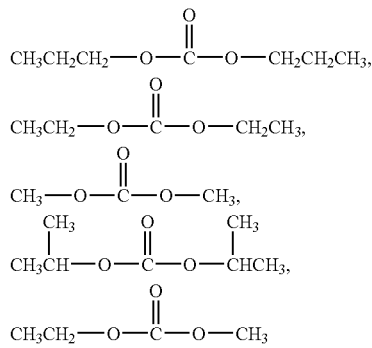

and the like are preferred.

Examples of other non-fluorine-containing chain carbonates which can be used are:

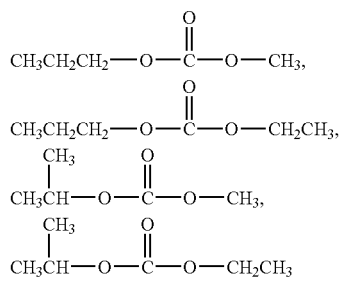

and the like.

Examples of preferred non-fluorine-containing chain esters are compounds represented by the formula (10):

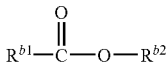

(10)

wherein $R^{b1}$ is an alkyl group having 1 to 2 carbon atoms; and $R^{b2}$ is an alkyl group having 1 to 4 carbon atoms.

Examples of non-fluorine-containing chain esters are, for instance, methyl acetate, ethyl acetate, propyl acetate, butyl acetate, methyl propionate and ethyl propionate, and from the viewpoint of low viscosity and high dielectric property, methyl acetate and ethyl acetate are preferred.

Examples of preferred non-fluorine-containing chain ethers are compounds represented by the formula (11-1):

(11-1)

or the formula (11-2):

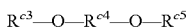

(11-2)

wherein $R^1$, $R^2$, $R^3$, $R^4$ and $R^5$ are the same or different, and each is an alkyl group having 3 to 6 carbon atoms.

Examples of non-fluorine-containing chain ethers are, for instance, dipropyl ether, dibutyl ether, 1,2-dimethoxyethane, and 1,2-diethoxyethane, and from the viewpoint of satisfactory cycle characteristics, 1,2-dimethoxyethane, and 1,2-diethoxyethane are preferred.

From the viewpoint of low resistance to reduction and unsatisfactory cycle characteristics, it is preferable not to use non-fluorine-containing cyclic ethers such as tetrahydrofuran and 1,4-dioxane.

Examples of non-fluorine-containing lactones are, for instance,

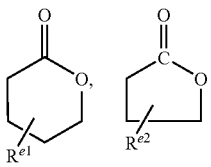

and the like, wherein $R^{e1}$ and $R^{e2}$ are alkyl groups having 1 to 4 carbon atoms.

Among these, from the viewpoint that especially excellent characteristics such as high dielectric constant and high withstanding voltage can be exhibited and solubility of an electrolyte salt and decrease in internal resistance are satisfactory, thereby improving characteristics of the electrical double layer capacitor of the present invention,

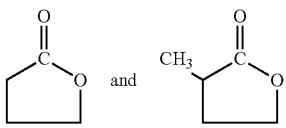

are preferred.

Examples of non-fluorine-containing sulfolane derivatives are, for instance,

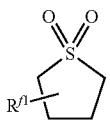

and the like, wherein $R^{f1}$ is hydrogen atom or an alkyl group having 1 to 4 carbon atoms.

Among these, from the viewpoint that especially excellent characteristics such as high dielectric constant and high withstanding voltage can be exhibited and solubility of an electrolyte salt and decrease in internal resistance are satisfactory, thereby improving characteristics of the electrical double layer capacitor of the present invention,

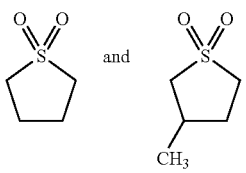

are preferred.

Examples of other non-fluorine-containing solvents for dissolving an electrolyte salt are nitrile type solvents, furans, oxolanes and the like.

Examples of these other non-fluorine-containing solvents are, for instance, nitrile type solvents such as acetonitrile, propionitrile, succinonitrile, butyronitrile, isobutyronitrile, benzonitrile and glutaronitrile; sulfoxides such as dimethyl sulfoxide; furans such as 2-methyltetrahydrofuran; oxolanes such as 1,3-dioxolane and 4-methyl-1,3-dioxolane; amides such as dimethylformamide and dimethylacetamide; sultones such as propanesultone and butanesultone; and the like. Especially from the viewpoint of improvement in dielectric constant, oxidation resistance and electrochemical stability and satisfactory low viscosity, nitrites, amides and sultones are preferred, and especially from the viewpoint of satisfactory dielectric constant and oxidation resistance, nitrites such as acetonitrile, succinonitrile and glutaronitrile are preferred, and succinonitrile and glutaronitrile are more preferred.

Examples of preferred solvents for dissolving an electrolyte salt which are used as co-solvents for the fluorine-containing cyclic carbonate represented by the formula (1) are fluorine-containing solvents for dissolving an electrolyte salt from the viewpoint of satisfactory oxidation resistance and viscosity, and fluorine-containing chain carbonates, fluorine-containing chain esters and fluorine-containing chain ethers are more preferred. Especially, a solvent comprising the fluorine-containing cyclic carbonate represented by the formula (1) and at least one kind selected from the group consisting of fluorine-containing chain carbonates, fluorine-containing chain esters and fluorine-containing chain ethers is preferred as the solvent (A) to be used for working at high voltage of not less than 3.5V. Particularly, fluorine-containing chain ethers are preferred from the viewpoint of satisfactory oxidation resistance.

Especially preferred combination of the fluorine-containing cyclic carbonate with fluorine-containing chain ether is a mixture of the fluorine-containing cyclic carbonate of

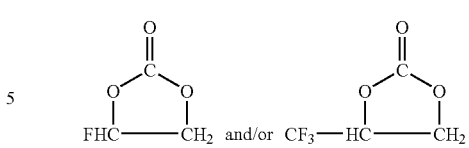

and at least one kind of a fluorine-containing chain ether selected from the group consisting of $CF_3CF_2CH_2$—O—$CF_2CFHCF_3$, $HCF_2CF_2CH_2$—O—$CF_2CFHCF_3$, $CF_3CF_2CH_2$—O—$CF_2CF_2H$ and $HCF_2CF_2CH_2$—O—$CF_2CF_2H$, from the viewpoint of satisfactory oxidation resistance and solubility of an electrolyte salt.

Next, the electrolyte salt (B) which is another component of the electrolytic solution used in the present invention is explained below.

The electrolyte salt (B) is a cyclic quaternary onium salt comprising a cyclic quaternary onium cation and a counter anion.

Examples of cyclic quaternary onium salts are spiro-ring bipyridinium salt, imidazolium salt, N-alkylpyridinium salt and N,N-dialkylpyrrolidinium salt. Particularly, from the viewpoint of satisfactory oxidation resistance, spiro-ring bipyridinium salt or ethyl methyl imidazolium salt is preferred.

Examples of preferred spiro-ring bipyridinium salt are spiro-ring bipyridinium salt represented by the formula (12-1):

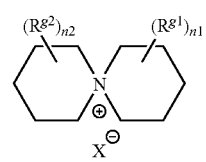

(12-1)

wherein $R^{g1}$ and $R^{g2}$ are the same or different and each is an alkyl group having 1 to 4 carbon atoms; $X^-$ is a counter anion; n1 is 0 or an integer of 1 to 5; n2 is 0 or an integer of 1 to 5, spiro-ring bipyridinium salt represented by the formula (12-2):

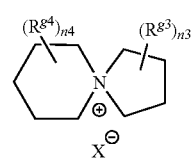

(12-2)

wherein $R^{g3}$ and $R^{g4}$ are the same or different and each is an alkyl group having 1 to 4 carbon atoms; $X^-$ is a counter anion; n3 is 0 or an integer of 1 to 5; n4 is 0 or an integer of 1 to 5, and spiro-ring bipyridinium salt represented by the formula (12-3):

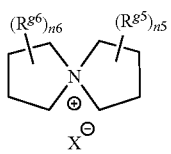
(12-3)

wherein $R^{g5}$ and $R^{g6}$ are the same or different and each is an alkyl group having 1 to 4 carbon atoms; $X^-$ is a counter anion; n5 is 0 or an integer of 1 to 5; n6 is 0 or an integer of 1 to 5. In addition, these spiro-ring bipyridinium salts, in which a part or the whole of hydrogen atoms thereof are substituted by fluorine atoms and/or fluorine-containing alkyl groups having 1 to 4 carbon atoms, are also preferred since oxidation resistance is improved.

With respect to the anion $X^-$, any of inorganic anions and organic anions may be used. Examples of inorganic anions are $AlCl_4^-$, $BF_4^-$, $PF_6^-$, $AsF_6^-$, $TaF_6^-$, $I^-$, $SbF_6^-$, and the like. Examples of organic anions are, for instance, $CH_3COO^-$, $CF_3SO_3^-$, $(CF_3SO_2)_2N^-$, $(C_2F_5SO_2)_2N^-$, and the like. Among these, from the viewpoint of high dissociation property and low internal resistance at high voltage, $BF_4^-$, $PF_6^-$, $(CF_3SO_2)_2N^-$, and $(C_2F_5SO_2)_2N^-$ are preferred, and especially $PF_6^-$ is more preferred.

Examples of preferred spiro-ring bipyridinium salts are, for instance,

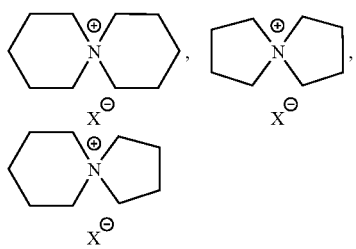

and the like.

These spiro-ring bipyridinium salts are excellent in solubility of an electrolyte salt, oxidation resistance and ionic conductivity.

Examples of preferred imidazolium salts are, for instance, imidazolium salts represented by the formula (13):

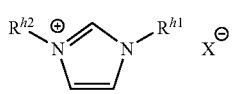
(13)

wherein $R^{h1}$ and $R^{h2}$ are the same or different and each is an alkyl group having 1 to 6 carbon atoms; $X^-$ is a counter anion. In addition, these imidazolium salts, in which a part or the whole of hydrogen atoms thereof are substituted by fluorine atoms and/or fluorine-containing alkyl groups having 1 to 4 carbon atoms, are also preferred since oxidation resistance is improved.

Preferred examples of the counter anion $X^-$ are the same as those of spiro-ring bipyridinium salts.

Examples of preferred imidazolium salts are, for instance, ethyl methyl imidazolium salts represented by the formula (14):

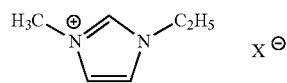
(14)

and the like.

These imidazolium salts are low in viscosity and excellent in solubility of an electrolyte salt.

Examples of preferred N-alkylpyridinium salts are, for instance, N-alkylpyridinium salts represented by the formula (16):

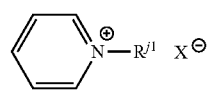
(16)

wherein $R^{j1}$ is hydrogen atom or an alkyl group having 1 to 6 carbon atoms; $X^-$ is a counter anion. In addition, these N-alkylpyridinium salts, in which a part or the whole of hydrogen atoms thereof are substituted by fluorine atoms and/or fluorine-containing alkyl groups having 1 to 4 carbon atoms, are also preferred since oxidation resistance is improved.

Preferred examples of the counter anion $X^-$ are the same as those of spiro-ring bipyridinium salts.

Preferred examples thereof are, for instance,

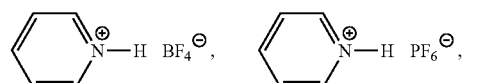
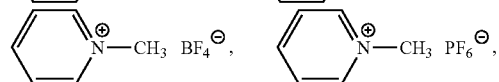
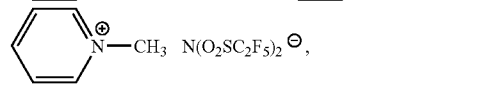
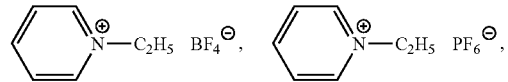
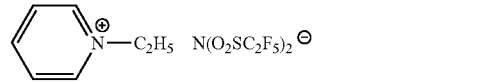

and the like.

These N-alkylpyridinium salts are low in viscosity and are excellent in solubility of an electrolyte salt.

Examples of preferred N,N-dialkylpyrrolidinium salt are N,N-dialkylpyrrolidinium salts represented by the formula (17):

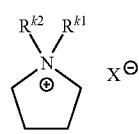
(17)

wherein $R^{k1}$ and $R^{k2}$ are the same or different and each is an alkyl group having 1 to 6 carbon atoms; $X^-$ is a counter anion. In addition, these N,N-dialkylpyrrolidinium salts, in which a part or the whole of hydrogen atoms thereof are substituted by fluorine atoms and/or fluorine-containing alkyl groups having 1 to 4 carbon atoms, are also preferred since oxidation resistance is improved.

Preferred examples of the counter anion $X^-$ are the same as those of spiro-ring bipyridinium salts.

Preferred examples thereof are, for instance,

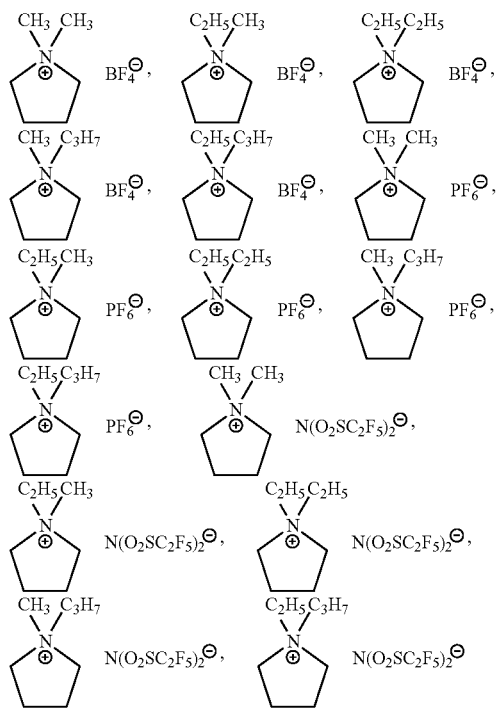

and the like.

These N,N-dialkylpyrrolidinium salts are low in viscosity and are excellent in solubility of an electrolyte salt.

Among these cyclic quaternary onium salts, spiro-ring bipyridinium salts and imidazolium salts are preferred from the viewpoint of solubility of an electrolyte salt, oxidation resistance and ionic conductivity, and further, preferred are spiro-ring bipyridinium salts represented by:

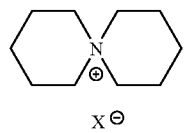

wherein $X^-$ is $BF_4^-$, $PF_6^-$, $(CF_3SO_2)_2N^-$ or $(C_2F_5SO_2)_2N^-$ and is especially $PF_6^-$, or ethyl methyl imidazolium salts represented by:

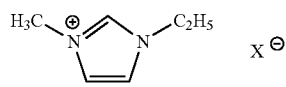

wherein $X^-$ is $BF_4^-$, $PF_6^-$, $(CF_3SO_2)_2N^-$ or $(C_2F_5SO_2)_2N^-$ and is especially $PF_6^-$.

In addition, lithium salt may be used together as an electrolyte salt. Examples of preferred lithium salt are $LiPF_6$, $LiBF_4$, $LiAsF_6$, $LiSbF_6$, and $LiN(SO_2C_2H_5)_2$.

Further, magnesium salt may be used to increase capacity. Examples of preferred magnesium salt are $Mg(ClO_4)_2$, $Mg(OOC_2H_5)_2$, and the like.

The amount of electrolyte salt (B) varies depending on required current density, application, kind of an electrolyte salt, and the like, and is preferably not less than 0.1 part by mass, further preferably not less than 1 part by mass, especially preferably not less than 5 parts by mass, and preferably not more than 200 parts by mass, further preferably not more than 100 parts by mass, especially preferably not more than 50 parts by mass, based on 100 parts by mass of the fluorine-containing cyclic carbonate (or based on the total amount of solvents when other solvent for dissolving an electrolyte salt is used together).

Further, there is a technique of blending a surfactant in order to achieve lower resistance of a cell.

With respect to a surfactant, any of a cationic surfactant, an anionic surfactant, a nonionic surfactant, and an ampholytic surfactant may be used, and from the viewpoint of satisfactory cycle characteristics and rate characteristics, fluorine-containing surfactants are preferred.

For example, there are preferably exemplified, fluorine-containing carboxylates represented by the formula (18):

$$Rf^1COO^-M^+$$

wherein $Rf^1$ is a perfluoro alkyl group having 2 to 10 carbon atoms, in which a part thereof may be substituted by hydrogen atoms; $M^+$ is $NH_4^+$, $Li^+$, $Na^+$, or $K^+$, and fluorine-containing sulfonates represented by the formula (19):

$$Rf^1SO_3^-M^+$$

wherein $Rf^1$ is a perfluoro alkyl group having 2 to 10 carbon atoms, in which a part thereof may be substituted by hydrogen atoms; $M^+$ is $NH_4^+$, $Li^+$, $Na^+$, or $K^+$.

It is preferable that $Rf^1$ is a fluorine-containing alkyl group having 2 to 10 carbon atoms, from the viewpoint a satisfactory degree of reduction of surface tension of the electrolytic solution is satisfactory, and especially a fluorine-containing alkyl group having 4 to 8 carbon atoms is preferred from the viewpoint of good solubility.

An alkali metal of $M^+$ is preferably Li, Na or K, and especially $NH_4^+$ is preferred as $NHR'_3^+$ of $M^+$.

Examples of fluorine-containing carboxylates represented by the formula (18) are, for instance, $C_4F_9COO^-NH_4^+$, $C_5F_{11}COO^-NH_4^+$, $C_6F_{13}COO^-NH_4^+$, $C_7F_{15}COO^-NH_4^+$, $C_8F_{17}COO^-NH_4^+$, $C_9F_{19}COO^-NH_4^+$, $C_4F_9COO^-NH(CH_3)_3^+$, $C_5F_{11}COO^-NH(CH_3)_3^+$, $C_6F_{13}COO^-NH(CH_3)_3^+$, $C_7F_{15}COO^-NH(CH_3)_3^+$, $C_8F_{17}COO^-NH(CH_3)_3^+$, $C_9F_{19}COO^-NH(CH_3)_3^+$, $C_4F_9COO^-Li^+$, $C_5F_{11}COO^-Li^+$, $C_6F_{13}COO^-Li^+$, $C_7F_{15}COO^-Li^+$, $C_8F_{17}COO^-Li^+$, $C_9F_{19}COO^-Li^+$, $C_4F_9COO^-Na^+$, $C_5F_{11}COO^-Na^+$, $C_6F_{13}COO^-Na^+$, $C_7F_{15}COO^-Na^+$, $C_8F_{17}COO^-Na^+$, $C_9F_{19}COO^-Na^+$, and the like. Among these, $C_5F_{11}COO^-NH_4^+$, $C_7F_{15}COO^-NH_4^+$, $C_5F_{11}COO^-Li^+$, $C_6F_{13}COO^-Li^+$, $C_5F_{11}COO^-Na^+$ and $C_6F_{13}COO^-Na^+$ are preferred from the viewpoint of good solubility in the electrolytic solution and a satisfactory effect of reduction of a surface tension.

Examples of fluorine-containing sulfonates represented by the formula (19) are, for instance, $C_4F_9SO_3^-NH_4^+$, $C_5F_{11}SO_3^-NH_4^+$, $C_6F_{13}SO_3^-NH_4^+$, $C_7F_{15}SO_3^-NH_4^+$, $C_8F_{17}SO_3^-NH_4^+$, $C_9F_{19}SO_3^-NH_4^+$, $C_4F_9SO_3^-NH(CH_3)_3^+$, $C_5F_{11}SO_3^-NH(CH_3)_3^+$, $C_6F_{13}SO_3^-NH(CH_3)_3^+$, $C_7F_{15}SO_3^-NH(CH_3)_3^+$, $C_8F_{17}SO_3^-NH(CH_3)_3^+$, $C_9F_{19}SO_3^-NH(CH_3)_3^+$, $C_4F_9SO_3^-Li^+$, $C_5F_{11}SO_3^-Li^+$, $C_6F_{13}SO_3^-Li^+$, $C_7F_{15}SO_3^-Li^+$, $C_8F_{17}SO_3^-Li^+$, $C_9F_{19}SO_3^-Li^+$, $C_4F_9SO_3^-Na^+$, $C_5F_{11}SO_3^-Na^+$, $C_6F_{13}SO_3^-Na^+$, $C_7F_{15}SO_3^-Na^+$, $C_8F_{17}SO_3^-Na^+$, $C_9F_{19}SO_3^{-Na+}$, and the like. Among these, $C_4F_9SO_3^-NH_4^+$, $C_5F_{11}SO_3^-NH_4^+$, $C_6F_{13}SO_3^-NH_4^+$, $C_8F_{17}SO_3^-NH_4^+$, $C_4F_9SO_3^-Li^+$, $C_5F_{11}SO_3^-Li^+$, $C_6F_{13}SO_3^-Li^+$, $C_8F_{17}SO_3^-Li^+$, $C_4F_9SO_3^-Na^+$, $C_5F_{11}SO_3^-Na^+$ and $C_6F_{13}SO_3^-Na^+$ are preferred from the viewpoint of good solubility in the electrolytic solution and a satisfactory effect of reduction of a surface tension.

The amount of surfactant is preferably 0.05 to 5% by mass, further preferably 0.05 to 3% by mass, especially preferably 0.05 to 2% by mass based on the whole solvent (A) from the viewpoint of decreasing a surface tension of the electrolytic solution without lowering charge and discharge cycle characteristics.

The electrolytic solution used in the present invention is prepared by dissolving the electrolyte salt (B) in the solvent (A) comprising a fluorine-containing cyclic carbonate or in the solvent (A) comprising a fluorine-containing cyclic carbonate and a solvent for dissolving the electrolyte salt.

In the present invention, the electrolytic solution may be in the form of gel (plasticized) prepared in combination with a polymer material which dissolves or swells in the solvent used for the electrolytic solution of the present invention.

Examples of the polymer material are known polyethylene oxide, polypropylene oxide and modified compounds thereof (JP8-222270A, JP2002-100405A); fluorine-containing resins such as polyacrylate polymer, polyacrylonitrile, polyvinylidene fluoride and vinylidene fluoride-hexafluoropropylene copolymer (JP4-506726A, JP8-507407A, JP10-294131A); complexes of those fluorine-containing resins with hydrocarbon resins (JP11-35765A, JP11-86630A) and the like. It is particularly desirable to use polyvinylidene fluoride and vinylidene fluoride-hexafluoropropylene copolymer as the polymer material for the gel electrolyte.

In addition, an ion-conducting compound disclosed in Japanese Patent Application No. 2004-301934 can be used.

This ion-conducting compound is a non-crystalline fluorine-containing polyether compound having a fluorine-containing group in its side chain and is represented by the formula (20):

P-(D)-Q        (20)

wherein D is represented by the formula (20-1):

-(D1)$_n$-(FAE)$_m$-(AE)$_p$-(Y)$_q$-    (20-1)

where D1 is an ether unit having a fluorine-containing ether group in its side chain and represented by the formula (20-1-1):

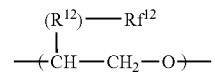
(20-1-1)

where $R^{11}$ is a fluorine-containing ether group which may have a crosslinkable functional group; $R^{11}$ is a group or bond bonding $Rf^{11}$ to a trunk chain;

FAE is an ether unit having a fluorine-containing alkyl group in its side chain and represented by the formula (20-1-2):

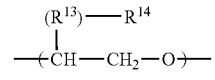
(20-1-2)

where $Rf^{12}$ is hydrogen atom or a fluorine-containing alkyl group which may have a crosslinkable functional group; $R^{12}$ is a group or bond bonding $Rf^{12}$ to the trunk chain;

AE is an ether unit represented by the formula (20-1-3):

(20-1-3)

where $R^{13}$ is hydrogen atom, an alkyl group which may have a crosslinkable functional group, an aliphatic cyclic hydrocarbon group which may have a crosslinkable functional group or an aromatic hydrocarbon group which may have a crosslinkable functional group;

$R^{14}$ is a group or bond bonding $R^{13}$ to the trunk chain;

Y is a unit having at least one of the formulae (20-1-4a) to (20-1-4c):

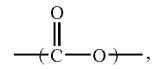
(20-1-4a)

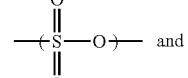
(20-1-4b)

and

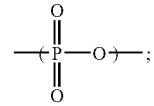
(20-1-4c)

n is 0 or an integer of 1 to 200; m is 0 or an integer of 1 to 200; p is 0 or an integer of 1 to 10,000; q is an integer of 1 to 100; n+m is not 0, and the order of bonding of D1, FAE, AE and Y is not specified;

P and Q are the same or different and each is hydrogen atom, an alkyl group which may have fluorine atom and/or a crosslinkable functional group, a phenyl group which may have fluorine atom and/or a crosslinkable functional group, —COOH, —OR$^{15}$ where R$^{15}$ is hydrogen atom or an alkyl group which may have fluorine atom and/or a crosslinkable functional group, an ester group or a carbonate group (when the end of D is oxygen atom, P and Q are not —COOH, —OR$^{15}$, an ester group and a carbonate group).

To the electrolytic solution of the present invention may be blended other additives as case demands. Examples of other additives are, for instance, metallic oxides, glass and the like.

It is preferable that the electrolytic solution used in the present invention does not freeze and the electrolyte salt is not precipitated at low temperatures (for example, at 0° C. and −20° C.). Specifically the viscosity at 0° C. is preferably not more than 100 mPa·s, more preferably not more than 30 mPa·s, particularly preferably not more than 15 mPa·s. Further specifically the viscosity at −20° C. is preferably not more than 100 mPa·s, more preferably not more than 40 mPa·s, particularly preferably not more than 15 mPa·s.

The electrolytic solution of the present invention can enhance flame retardance, low temperature characteristics, solubility of the electrolyte salt and compatibility with hydrocarbon solvents at the same time, and stable characteristics can be obtained at a withstanding voltage exceeding 3.5V, further at a withstanding voltage exceeding 4.0V, and therefore is suitable as an electrolytic solution for an electrical double layer capacitor.

In the electrical double layer capacitor of the present invention, at least either a positive electrode or a negative electrode is a polarizable electrode (C) comprising activated carbon.

In the activated carbon used for the polarizable electrode (C), its potassium content measured by an extraction method is preferably 0 to 400 ppm, further preferably 0 to 200 ppm from the viewpoint of cycle characteristics at high voltage and decrease in internal resistance.

This specific activated carbon is contained in an amount of preferably 60 to 100% by mass, further preferably 80 to 95% by mass in the polarizable electrode (C), from the viewpoint of increase in capacity and decrease in internal resistance.

Such activated carbon having low potassium content can be prepared by a method of carrying out usual alkali (potassium) activation and then sufficient washing, a method of activating with steam or phosphoric acid, or the like method.

Especially, activated carbon prepared by an alkali (potassium) activation method using pitch as a starting material is preferred from the viewpoint that oxidation resistance is satisfactory and cell capacity is increased. Examples of such activated carbon are NK331 and NK260 available from KURARAY CHEMICAL CO., LTD.

The activated carbon extraction method used in the present invention is a method of adding activated carbon in water, filtering the solution after stirring and then measuring a potassium content of the obtained filtered solution. The potassium content is measured with an ion meter.

The polarizable electrode (C) used in the present invention is one mainly comprising the above-mentioned specific activated carbon, and may comprise inactive carbon having a large specific surface area and conductive material such as carbon black imparting electron conducting property. This polarizable electrode (C) can be prepared by various methods. For example, the polarizable electrode (C) comprising activated carbon and carbon black can be formed by mixing activated carbon powder, carbon black and phenol resin, and then after press-molding, carrying out sintering in inert gas atmosphere and activation in steam atmosphere. Preferably this polarizable electrode (C) is jointed to a current collector with a conductive adhesive.

In addition, the polarizable electrode (C) can be formed by kneading a specific activated carbon powder, carbon black and a binding agent in the presence of alcohol, molding into a sheet-like form and then drying. For example, polytetrafluoroethylene is used as a binding agent. Also, the polarizable electrode (C) incorporated with a current collector can be formed by mixing an activated carbon powder, carbon black, a binding agent and a solvent to prepare slurry and then coating this slurry on a metallic foil of a current collector and drying it.

The electrical double layer capacitor may be prepared by using the polarizable electrode (C) mainly comprising a specific activated carbon on both electrodes, or can be prepared so as to have a non-polarizable electrode on one electrode, for example, a combination of a positive electrode mainly comprising an active material such as metallic oxide with the polarizable electrode (C) mainly comprising an activated carbon as a negative electrode.

In addition, a carbonaceous material such as carbon black, graphite, expansive graphite, porous carbon, carbon nanotube, carbon nanohorn or KETJEN BLACK instead of or in combination with activated carbon.

In preparation of an electrode, a preferred solvent used for preparing slurry is one dissolving a binding agent, and is optionally selected from N-methylpyrrolidone, dimethylformamide, toluene, xylene, isophorone, methyl ethyl ketone, ethyl acetate, methyl acetate, dimethyl phthalate, ethanol, methanol, butanol and water, depending on kind of a binding agent.

Examples of preferred conductive material to be used on the polarizable electrode (C) are carbon black, KETJEN BLACK, acetylene black, natural graphite, artificial graphite, metallic fiber, conductive titanium oxide, and ruthenium oxide. It is preferable that the amount of conductive material such as carbon black to be used on the polarizable electrode (C) is 1 to 50% by mass based on the total amount of conductive material and activated carbon so as to obtain satisfactory conductivity (low internal resistance) and also because when the amount is too large, capacity of a product is decreased.

The current collector may be one having chemical and electrochemical resistance to corrosion. For the current collector used on the polarizable electrode mainly comprising activated carbon, there can be preferably used stainless steel, aluminum, titanium and tantalum. Among these, stainless steel and aluminum are especially preferred materials from the viewpoint of both of characteristics and price of the obtained electrical double layer capacitor.

EXAMPLE

The present invention is then explained by means of Examples and Comparative Examples, but is not limited to them.

Example 1

Non-aqueous electrolytic solutions were prepared by adding electrolyte salts shown in Table 1 to solvents for dissolving an electrolyte salt shown in Table 1 so as to give a concentration of electrolyte salt of 1 mol/liter. Solubility of an electrolyte salt and potential window of the electrolytic solutions were examined by the methods explained below. The results are shown in Table 1.

(1) Solubility of Electrolyte Salt

A state of an electrolyte salt dissolved in an electrolytic solution was observed with naked eyes.

○: Dissolved homogeneously.

Δ: Slightly suspended.

x: Insoluble matter precipitated.

(2) Potential Window

The electrolytic solution is put in a 3-electrode type voltage measuring cell (working electrode, counter electrode: platinum (area ratio of counter electrode to working electrode is 5:1), reference electrode: Ag, HS cell available from Hosen Kabushiki Kaisha). Sweeping of electric potential is carried out at 3 mV/sec with a potentiostat, and a decomposition current is measured.

Abbreviations of the electrolyte salts in Table 1 are as follows.

SBP.PF$_6$: PF$_6$ salt of spiro-ring bipyridinium
EMI.TFSI: [(CF$_3$SO$_2$)$_2$N] salt of ethyl methyl imidazolium
EMI.PF$_6$: PF$_6$ salt of ethyl methyl imidazolium

TABLE 1

| | Solvent for dissolving electrolyte salt | Electrolyte salt | Concentration (mol/L) | Solubility of electrolyte salt | Potential window (V) |
|---|---|---|---|---|---|
| Experimental Example 1-1 | 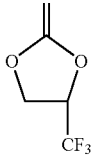 | SBP•PF$_6$ | 1 | ○ | −3.2 to 4.8 |
| Experimental Example 1-2 | " | EMI•TFSI | 1 | ○ | −3.1 to 4.5 |
| Experimental Example 1-3 | " | EMI•PF$_6$ | 1 | ○ | −3.0 to 4.5 |
| Experimental Example 1-4 | 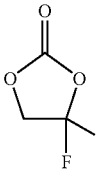 | SBP•PF$_6$ | 1 | ○ | −3.2 to 4.5 |

Example 2

Solubility of an electrolyte salt in an electrolytic solution prepared by the method explained below was examined in the same manner as in Example 1, and with respect to a coin type electrical double layer capacitor produced by the method explained below, capacity (F/g) and internal resistance (Ω) were examined. The results are shown in Tables 2 and 3.

(Preparation of Electrolytic Solution)

A non-aqueous electrolytic solution was prepared by adding electrolyte salts shown in Tables 2 and 3 to solvents for dissolving an electrolyte salt shown in Tables 2 and 3 so as to give a concentration of electrolyte salt of 1 mol/liter. When an additive (C$_4$F$_9$SO$_3$Li (Experiment 2-5), C$_5$F$_{11}$COOLi (Experiment 2-6)) is blended, it was added and dissolved so that its content became 1% by mass. When there was an insoluble matter in the solution, it was filtered off by using a 4 μm polytetrafluoroethylene (PTFE) filter before use as an electrolytic solution.

(Preparation of Electrode)

85 parts by mass of activated carbon shown in Table 2, 10 parts by mass of carbon black (trade name: Denka Black available from Denki Kagaku Kogyo Kabushiki Kaisha), 5 parts by mass (solid content) of elastomer binder (trade name: AD181 available from ZEON CORPORATION), 3 parts by mass of carboxymethyl cellulose (trade name: DN800H available from Daicel Chemical Industries, Ltd.) and 200 parts by mass of water were kneaded for 30 minutes with a stirrer to prepare a slurry.

This slurry was coated on a 40 μm thick aluminum current collector with a bar coater and dried at 70° C. for one hour and then at 130° C. for one hour to make a 100 μm thick electrode which was then punched into a disc having a diameter of 13 mm. Thus, an electrode was prepared.

(Production of Coin Type Electrical Double Layer Capacitor)

The prepared disk-like electrodes were stuck on the inner surfaces at both of a positive electrode side and a negative electrode side of a stainless steel case doubled as a current collector and a housing member of the coin type electrical double layer capacitor by using a graphite type adhesive. Next, this stainless steel case was subjected to heat treatment at 130° C. under reduced pressure to remove moisture, and the disc-like electrode was impregnated with the prepared electrolytic solution. Then, a separator (thickness: 50 μm) made of cellulose was put between the both electrodes and the stainless steel case was sealed by caulking with a gasket which was an insulator. Thus a 2.0 mm thick coin type electrical double layer capacitor having a diameter of 18.4 mm was produced.

(Measurement of Capacity and Internal Resistance in Charge and Discharge Cycle)

The produced coin type electrical double layer capacitor was subjected to charging at 5 mA up to 3.5V, 4.0V or 5.0V, and after holding at that voltage for five minutes, was subjected to discharging at 5 mA as shown in Tables 2 and 3. This charging and discharging is assumed to be one cycle. This charge and discharge cycle was repeated and initial characteristics (capacity and internal resistance) were examined by the following methods.

Capacity: Capacity is calculated from a voltage gradient at constant discharging.

Internal resistance: Internal resistance is calculated from so-called IR drop voltage when conducting constant-current discharging.

Abbreviations of electrolyte salts and activated carbons in Tables 2 to 7 are as follows.

SBP.PF$_6$: PF$_6$ salt of spiro-ring bipyridinium
SBP.BF$_4$: BF$_4$ salt of spiro-ring bipyridinium
EMI.TFSI: [(CF$_3$SO$_2$)$_2$N] salt of ethyl methyl imidazolium
EMI.PF$_6$: PF$_6$ salt of ethyl methyl imidazolium
DEME.PF$_6$: PF$_6$ salt of N,N-diethyl-N-methyl-N-(2-methoxyethyl)ammonium
NK331: Activated carbon available from KURARAY CHEMICAL CO., LTD. (activated carbon prepared by potassium activation using pitch as a starting material, potassium content: 180 ppm)
NK260: Activated carbon available from KURARAY CHEMICAL CO., LTD. (activated carbon prepared by potassium activation using pitch as a starting material, potassium content: 140 ppm)
MSP20: Activated carbon available from Kansai Coke And Chemicals Co., LTD. (potassium content: 50 ppm)
RP20: Activated carbon available from KURARAY CHEMICAL CO., LTD. (potassium content: 10 ppm)

Potassium content of activated carbon is measured by stirring 1 g of activated carbon in 50 ml of pure water, filtering off the activated carbon and analyzing the obtained filtrate by fluorescent X-ray spectroscopy (RIX-3100 available from Rigaku Corporation, measuring conditions: 30 kV-130 mA in vacuo using Rh lamp.

TABLE 2

| | Solvent for dissolving electrolyte salt | Electrolyte salt | Concentration (mol/L) | Solubility of electrolyte salt | Activated carbon | Additive | Voltage (V) | Capacity (F/g) | Internal resistance (Ω) |
|---|---|---|---|---|---|---|---|---|---|
| Exp. Ex. 2-1 | 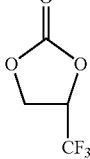 | SBP•PF$_6$ | 1 | ○ | NK260 | — | 3.5 | 54.3 | 33 |
| Exp. Ex. 2-2 | " | SBP•PF$_6$ | 1 | ○ | NK260 | — | 4.0 | 65.2 | 24 |
| Exp. Ex. 2-3 | " | SBP•PF$_6$ | 1 | ○ | NK260 | — | 4.5 | 72.7 | 77 |
| Exp. Ex. 2-4 | " | SBP•PF$_6$ | 1 | ○ | NK260 | — | 5.0 | 75.9 | 119 |
| Exp. Ex. 2-5 | " | SBP•PF$_6$ | 1 | ○ | NK260 | ○ | 3.5 | 21.1 | 25 |
| Exp. Ex. 2-6 | " | SBP•PF$_6$ | 1 | ○ | NK260 | ○ | 4.0 | 13.6 | 50 |
| Exp. Ex. 2-7 | " | SBP•PF$_6$ | 1 | ○ | RP20 | — | 3.5 | 36.7 | 37 |
| Exp. Ex. 2-8 | " | SBP•PF$_6$ | 1 | ○ | RP20 | — | 4.0 | 39.2 | 92 |
| Exp. Ex. 2-9 | " | EMI•PF$_6$ | 1 | ○ | NK260 | — | 3.5 | 27.1 | 61 |
| Exp. Ex. 2-10 | " | EMI•PF$_6$ | 1 | ○ | NK260 | — | 4.0 | 23.8 | 123 |
| Exp. Ex. 2-11 | 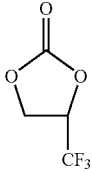 | EMI•TFSI | 1 | ○ | NK260 | — | 3.5 | 34.3 | 61 |
| Exp. Ex. 2-12 | " | EMI•TFSI | 1 | ○ | NK260 | — | 4.0 | 33.4 | 123 |
| Exp. Ex. 2-13 | " | EMI•PF$_6$ | 1 | ○ | RP20 | — | 3.5 | 23.9 | 57 |
| Exp. Ex. 2-14 | " | EMI•PF$_6$ | 1 | ○ | RP20 | — | 4.0 | 28.9 | 165 |
| Exp. Ex. 2-15 | " | EMI•PF$_6$ | 1 | ○ | MSP20 | — | 3.5 | 28.8 | 55 |
| Exp. Ex. 2-16 | " | EMI•PF$_6$ | 1 | ○ | MSP20 | — | 4.0 | 30.1 | 135 |
| Exp. Ex. 2-17 | " | 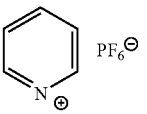 | 1 | ○ | MSP20 | — | 3.5 | 25.6 | 113 |
| Exp. Ex. 2-18 | " | DEME•PF$_6$ | 1 | ○ | MSP20 | — | 3.5 | 33.1 | 25 |
| Exp. Ex. 2-19 | " | DEME•PF$_6$ | 1 | ○ | MSP20 | — | 4.0 | 37.1 | 38 |

TABLE 3

| | Solvent for dissolving electrolyte salt | Electrolyte salt | Concentration (mol/L) | Solubility of electrolyte salt | Activated carbon | Additive | Voltage (V) | Capacity (F/g) | Internal resistance (Ω) |
|---|---|---|---|---|---|---|---|---|---|
| Exp. Ex. 2-20 | 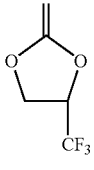 | SBP•PF$_6$ | 1 | ○ | NK260 | — | 3.5 | 57.3 | 23 |
| Exp. Ex. 2-21 | " | SBP•PF$_6$ | 1 | ○ | NK260 | — | 4.0 | 68.2 | 14 |
| Exp. Ex. 2-22 | " | SBP•PF$_6$ | 1 | ○ | NK260 | — | 4.5 | 75.7 | 67 |
| Exp. Ex. 2-23 | " | SBP•PF$_6$ | 1 | ○ | NK260 | — | 5.0 | 78.9 | 109 |
| Exp. Ex. 2-24 | " | EMI•PF$_6$ | 1 | ○ | RP20 | — | 3.5 | 34.6 | 40 |
| Exp. Ex. 2-25 | " | EMI•PF$_6$ | 1 | ○ | RP20 | — | 4.0 | 35.2 | 78 |

Example 3

An electrolytic solution was prepared and a coin type electrical double layer capacitor was produced in the same manner as in Example 2 except that a solvent mixture obtained by mixing two kinds of solvents in a ratio shown in Tables 4 and 5 was used as a solvent for dissolving an electrolyte salt. By using the solution and the capacitor, solubility of an electrolyte salt, and capacitor (F/g) and internal resistance (Ω) at a charge and discharge cycle test were examined in the same manner as in Example 2. The results are shown in Tables 4 and 5.

Abbreviations in Tables 4 and 5 are the same as in Tables 2 and 3.

TABLE 4

| | Solvent 1 for dissolving electrolyte salt | Solvent 2 for dissolving electrolyte salt | Solvent 1/ solvent 2 (Vol %) | Electrolyte salt | Concentration (mol/L) | Solubility of electrolyte salt | Activated carbon | Voltage (V) | Capacity (F/g) | Internal resistance (Ω) |
|---|---|---|---|---|---|---|---|---|---|---|
| Exp. Ex. 3-1 | 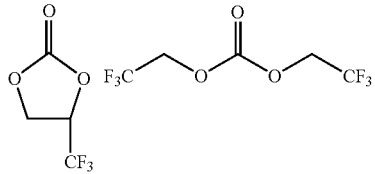 | 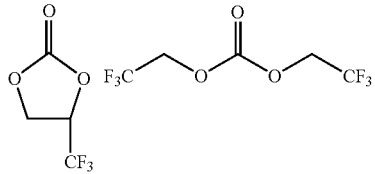 | 80/20 | SBP•PF$_6$ | 1 | ○ | NK260 | 3.5 | 28.5 | 40 |
| Exp. Ex. 3-2 | " | " | 80/20 | SBP•PF$_6$ | 1 | ○ | NK260 | 4.0 | 29.4 | 154 |
| Exp. Ex. 3-3 | " | 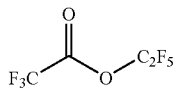 | 70/30 | SBP•PF$_6$ | 1 | ○ | NK260 | 3.5 | 31.3 | 49 |
| Exp. Ex. 3-4 | " | " | 70/30 | SBP•PF$_6$ | 1 | ○ | NK260 | 4.0 | 34.3 | 150 |
| Exp. Ex. 3-5 | " | 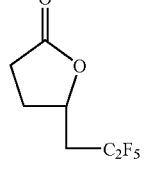 | 50/50 | EMI•PF$_6$ | 1 | ○ | MSP20 | 3.5 | 35.6 | 138 |
| Exp. Ex. 3-6 | " | " | 50/50 | EMI•PF$_6$ | 1 | ○ | MSP20 | 4.0 | 37.8 | 213 |
| Exp. Ex. 3-7 | " | 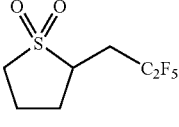 | 50/50 | EMI•PF$_6$ | 1 | ○ | NK260 | 3.5 | 47.5 | 49 |
| Exp. Ex. 3-8 | 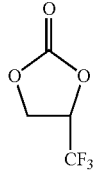 | 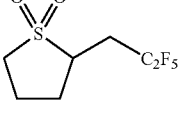 | 70/30 | EMI•PF$_6$ | 1 | ○ | NK260 | 4.0 | 49.3 | 119 |
| Exp. Ex. 3-9 | " | sulfolane | 70/30 | EMI•PF$_6$ | 1 | ○ | NK260 | 3.5 | 42.5 | 40 |
| Exp. Ex. 3-10 | " | sulfolane | 70/30 | EMI•PF$_6$ | 1 | ○ | NK260 | 4.0 | 43.5 | 121 |
| Exp. Ex. 3-11 | " | diethyl carbonate | 70/30 | EMI•PF$_6$ | 1 | ○ | NK260 | 3.5 | 51.2 | 45 |
| Exp. Ex. 3-12 | " | diethyl carbonate | 70/30 | EMI•PF$_6$ | 1 | ○ | NK260 | 4.0 | 53.4 | 79 |
| Exp. Ex. 3-13 | " | methyl acetate | 50/50 | EMI•PF$_6$ | 1 | ○ | NK260 | 3.5 | 43.4 | 50 |
| Exp. Ex. 3-14 | " | methyl acetate | 50/50 | EMI•PF$_6$ | 1 | ○ | NK260 | 4.0 | 45.4 | 65 |
| Exp. Ex. 3-15 | " | ethylene carbonate | 80/20 | SBP•PF$_6$ | 1 | ○ | NK260 | 3.5 | 40.4 | 49 |
| Exp. Ex. 3-16 | " | ethylene carbonate | 80/20 | SBP•PF$_6$ | 1 | ○ | NK260 | 4.0 | 47.8 | 49 |

TABLE 4-continued

| | Solvent 1 for dissolving electrolyte salt | Solvent 2 for dissolving electrolyte salt | Solvent 1/ solvent 2 (Vol %) | Electrolyte salt | Concentration (mol/L) | Solubility of electrolyte salt | Activated carbon | Voltage (V) | Capacity (F/g) | Internal resistance (Ω) |
|---|---|---|---|---|---|---|---|---|---|---|
| Exp. Ex. 3-17 | " | vinylene carbonate | 80/20 | SBP•PF$_6$ | 1 | ○ | NK260 | 3.5 | 50.2 | 137 |

TABLE 5

| | Solvent 1 for dissolving electrolyte salt | Solvent 2 for dissolving electrolyte salt | Solvent 1/ solvent 2 (Vol %) | Electrolyte salt | Concentration (mol/L) | Solubility of electrolyte salt | Activated carbon | Voltage (V) | Capacity (F/g) | Internal resistance (Ω) |
|---|---|---|---|---|---|---|---|---|---|---|
| Exp. Ex. 3-18 | 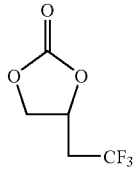 | 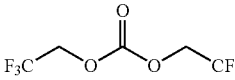 | 30/70 | EMI•PF$_6$ | 1 | ○ | MSP20 | 3.5 | 3.5 | 139 |
| Exp. Ex. 3-19 | " | " | 30/70 | EMI•PF$_6$ | 1 | ○ | MSP20 | 4.0 | 54.5 | 311 |
| Exp. Ex. 3-20 | 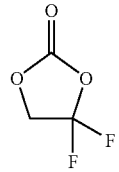 | " | 70/30 | SBP•PF$_6$ | 1 | ○ | NK260 | 3.5 | 45.2 | 44 |
| Exp. Ex. 3-21 | " | " | 70/30 | SBP•PF$_6$ | 1 | ○ | NK260 | 4.0 | 47.3 | 57 |

Example 4

A coin type electrical double layer capacitor was produced in the same manner as in Example 2 by using an electrolytic solution shown in Table 6. The produced coin type electrical double layer capacitor was subjected to charging at 5 mA up to 4.0V (3.5V in Experimental Examples 4-5 and 4-6 for comparison), and after holding at that voltage for five minutes, was subjected to discharging at 5 mA. This charging and discharging is assumed to be one cycle. This cycle was repeated, and a capacity retention ratio (retention capacity) at 500th cycle compared with a capacity at 5th cycle was calculated. The results are shown in Table 6.

In Table 6, TEMA represents triethylmethylammonium, and other abbreviations are the same as in Tables 2 and 3.

TABLE 6

| | Solvent for dissolving electrolyte salt | Electrolyte salt | Concentration (mol/L) | Solubility of electrolyte salt | Activated carbon | Voltage (V) | Retention capacity (%) |
|---|---|---|---|---|---|---|---|
| Exp. Ex. 4-1 | 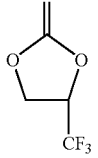 | SBP•PF$_6$ | 1 | ○ | MK260 | 4.0 | 156 |
| Exp. Ex. 4-2 | " | SBP•PF$_6$ | 1 | ○ | RP20 | 4.0 | 156 |
| Exp. Ex. 4-3 | " | EMI•PF$_6$ | 1 | ○ | RP20 | 4.0 | 130 |

TABLE 6-continued

| | Solvent for dissolving electrolyte salt | Electrolyte salt | Concentration (mol/L) | Solubility of electrolyte salt | Activated carbon | Voltage (V) | Retention capacity (%) |
|---|---|---|---|---|---|---|---|
| Exp. Ex. 4-4 | ![fluorinated cyclic carbonate with two F on same carbon] | SBP•PF$_6$ | 1 | ○ | MK260 | 4.0 | 110 |
| Exp. Ex. 4-5 | Propylene carbonate | TEMA | 1 | ○ | MSP20 | 3.5 | 85 |
| Exp. Ex. 4-6 | Propylene carbonate | TEMA | 1 | ○ | RP20 | 3.5 | 91 |

Example 5

A coin type electrical double layer capacitor was produced in the same manner as in Example 2 by using an electrolytic solution shown in Table 7, and various characteristics of this coin type electrical double layer capacitor were examined in the same manner as in Example 4. The results are shown in Table 7.

With respect to the abbreviations in Table 7, NK331 represents activated carbon available from KURARAY CHEMICAL CO., LTD. (activated carbon prepared by potassium activation using pitch as a starting material, potassium content: 180 ppm), SBP.BF$_4$ is BF$_4$ salt of spiro-ring bipyridinium, and others are the same as in Tables 2 and 3.

TABLE 7

| | Solvent 1 for dissolving electrolyte salt | Solvent 2 for dissolving electrolyte salt | Solvent 1/ solvent 2 (Vol %) | Electrolyte salt | Concentration (mol/L) | Solubility of electrolyte salt | Activated carbon | Voltage (V) | Retention capacity (%) |
|---|---|---|---|---|---|---|---|---|---|
| Exp. Ex. 5-1 | [cyclic carbonate with CF$_3$] | HCF$_2$CF$_2$CH$_2$OCF$_2$CF$_2$H | 50/50 | SBP•PF$_6$ | 1 | ○ | NK331 | 4.0 | 121 |
| Exp. Ex. 5-2 | " | " | 50/50 | SBP•BF$_4$ | 1 | ○ | NK331 | 3.5 | 100 |
| Exp. Ex. 5-3 | " | " | 30/70 | SBP•PF$_6$ | 1 | ○ | NK331 | 4.0 | 110 |
| Exp. Ex. 5-4 | " | " | 30/70 | SBP•BF$_4$ | 1 | ○ | NK331 | 3.5 | 105 |
| Exp. Ex. 5-5 | [cyclic carbonate with F] | " | 50/50 | EMI•BF$_4$ | 1 | ○ | NK331 | 3.5 | 112 |
| Exp. Ex. 5-6 | " | " | 30/70 | EMI•BF$_4$ | 1 | ○ | NK331 | 3.5 | 105 |
| Exp. Ex. 5-7 | [cyclic carbonate with CF$_3$] | CF$_3$CH$_2$OCOCH$_2$CF$_3$ | 50/50 | SBP•BF$_4$ | 1 | ○ | NK331 | 3.5 | 110 |
| Exp. Ex. 5-8 | " | " | 30/70 | SBP•BF$_4$ | 1 | ○ | NK331 | 3.5 | 108 |
| Exp. Ex. 5-9 | " | CF$_3$CH$_2$OCOCH$_3$ | 50/50 | SBP•PF$_6$ | 1 | ○ | NK331 | 3.5 | 109 |

TABLE 7-continued

| | Solvent 1 for dissolving electrolyte salt | Solvent 2 for dissolving electrolyte salt | Solvent 1/ solvent 2 (Vol %) | Electrolyte salt | Concentration (mol/L) | Solubility of electrolyte salt | Activated carbon | Voltage (V) | Retention capacity (%) |
|---|---|---|---|---|---|---|---|---|---|
| Exp. Ex. 5-10 | " | CF$_3$CH$_2$OCOCH$_3$ | 30/70 | SBP•BF$_4$ | 1 | ○ | NK331 | 3.5 | 108 |

INDUSTRIAL APPLICABILITY

According to the present invention, an electrical double layer capacity having high withstanding voltage and assuring excellent solubility in a wide range of solvents for dissolving an electrolyte salt can be provided.

The invention claimed is:

1. An electrical double layer capacitor comprising:
a non-aqueous electrolytic solution comprising (A) a solvent comprising a mixture of a fluorine-containing cyclic carbonate represented by the formula (1):

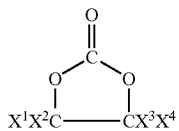

(1)

wherein $X^1$ to $X^4$ are the same or different and each is —H, —F, —CF$_3$, —CHF$_2$, —CH$_2$F, —C$_2$F$_5$ or —CH$_2$CF$_3$; at least one of $X^1$ to $X^4$ is —F, —CF$_3$, —C$_2$F$_5$ or —CH$_2$CF$_3$, and at least one kind selected from the group consisting of a fluorine-containing chain ester and a fluorine-containing chain ether, and (B) an electrolyte salt comprising a cyclic quaternary onium salt comprising a cyclic quaternary onium cation and a counter anion, and
(C) a polarizable electrode comprising activated carbon,
wherein the fluorine-containing chain ether is at least one kind selected from the group consisting of CF$_3$CF$_2$CH$_2$—O—CF$_2$CFHCF$_3$, HCF$_2$CF$_2$CH$_2$—O—CF$_2$CFHCF$_3$, CF$_3$CF$_2$CH$_2$—O—CF$_2$CF$_2$H, and HCF$_2$CF$_2$CH$_2$—O—CF$_2$CF$_2$H.

2. The electrical double layer capacitor of claim 1, wherein the fluorine-containing cyclic carbonate contained in the solvent (A) is at least one kind selected from the group consisting of:

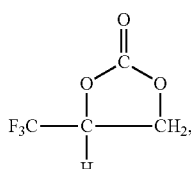 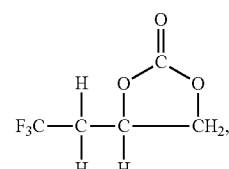

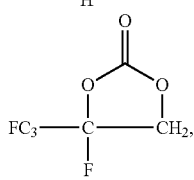 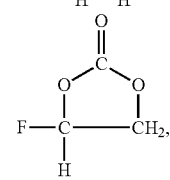

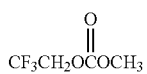

and.

3. The electrical double layer capacitor of claim 1, wherein the fluorine-containing chain ester is represented by the formula (3):

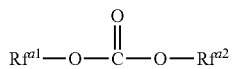

(2)

$$Rf^{b1}-O-\overset{O}{\underset{\|}{C}}-O-Rf^{b2}$$

wherein $Rf^{b1}$ and $Rf^{b2}$ are the same or different and each is a fluorine-containing alkyl group having 1 to 4 carbon atoms.

4. The electrical double layer capacitor of claim 1, wherein the solvent (A) is a mixture of a fluorine-containing cyclic carbonate of

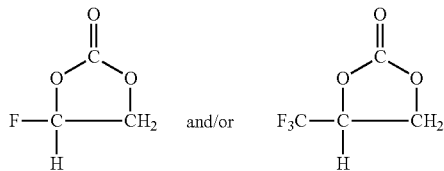

and at least one kind of a fluorine-containing chain ether selected from the group consisting of CF$_3$CF$_2$CH$_2$—O—CF$_2$CFHCF$_3$, HCF$_2$CF$_2$CH$_2$—O—CF$_2$CFHCF$_3$, CF$_3$CF$_2$CH$_2$—O—CF$_2$CF$_2$H, and HCF$_2$CF$_2$CH$_2$—O—CF$_2$CF$_2$H.

5. The electrical double layer capacitor of claim 1, wherein the cyclic quaternary onium salt is a spiro-ring bipyridinium salt or an imidazolium salt.

6. The electrical double layer capacitor of claim 1, wherein the counter anion of the cyclic quaternary onium salt is PF$_6^-$, BF$_4^-$, (CF$_3$SO$_2$)$_2$N$^-$ or (C$_2$F$_5$SO$_2$)$_2$N$^-$.

7. The electrical double layer capacitor of claim 1, wherein the anion is PF$_6^-$.

8. The electrical double layer capacitor of claim 1, wherein the activated carbon is one having a potassium content of 0 to 400 ppm measured by an extraction method.

9. The electrical double layer capacitor of claim 1, wherein the activated carbon is one prepared by alkali activation method using pitch as a starting material.

10. The electrical double layer capacitor of claim 1, wherein the non-aqueous electrolytic solution contains 0.05 to 5% by mass of a surfactant based on the weight of the solvent (A).

11. The electrical double layer capacitor of claim 10, wherein the surfactant is one represented by the formula (18):

wherein $Rf^1$ is a perfluoroalkyl group having 2 to 10 carbon atoms in which a part thereof is replaced by hydrogen atoms, $M^+$ is $NH_4^+$, $Li^+$, $Na^+$ or $K^+$, or the formula (19):

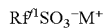

wherein $Rf^1$ is a perfluoroalkyl group having 2 to 10 carbon atoms in which a part thereof is replaced by hydrogen atoms, $M^+$ is $NH_4^+$, $Li^+$, $Na^+$ or $K^+$.

12. The electrical double layer capacitor of claim 1, wherein the fluorine-containing cyclic carbonate contained in the solvent (A) is at least one kind selected from the group consisting of:

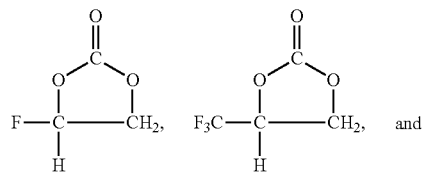

and

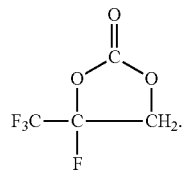

* * * * *